(12) United States Patent
Takahashi

(10) Patent No.: US 8,416,502 B2
(45) Date of Patent: Apr. 9, 2013

(54) ZOOM LENS

(75) Inventor: Makoto Takahashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 13/163,004

(22) Filed: Jun. 17, 2011

(65) Prior Publication Data

US 2011/0317279 A1    Dec. 29, 2011

(30) Foreign Application Priority Data

Jun. 24, 2010 (JP) ................................ 2010-144216

(51) Int. Cl.
 *G02B 9/00* (2006.01)
 *G02B 15/14* (2006.01)
(52) U.S. Cl. ...................................... 359/649; 359/688
(58) Field of Classification Search .......... 359/649–651, 359/688
 See application file for complete search history.

(56) References Cited

U.S. PATENT DOCUMENTS

2009/0103188 A1* 4/2009 Wada ............................ 359/688

FOREIGN PATENT DOCUMENTS

| JP | 8-297243 A | 11/1996 |
| JP | 2005-309061 A | 11/2005 |

* cited by examiner

*Primary Examiner* — William Choi
(74) *Attorney, Agent, or Firm* — Canon U.S.A., Inc. IP Division

(57) ABSTRACT

A zoom lens includes, in order from an enlargement side to a reduction side, a first lens unit having a positive refractive power, which is stationary for variation of magnification, a second lens unit having a negative refractive power, which moves for variation of magnification, a third lens unit having a negative refractive power, which moves for variation of magnification, a fourth lens unit having a positive refractive power, which includes a stop and which moves for variation of magnification, and at least one lens unit. In the zoom lens, for variation of magnification from a wide-angle end to a telephoto end, the second lens unit and the third lens unit move towards the reduction side and the fourth lens unit move towards the enlargement side. The zoom lens satisfies an appropriate condition.

9 Claims, 10 Drawing Sheets

ZOOM LENS

BACKGROUND OF THE INVENTION

1. Field of the Invention

The present invention relates to a zoom lens (magnification varying optical system). In particular, the present invention relates to a zoom lens used on a projection apparatus configured to project an image on a screen.

2. Description of the Related Art

In a conventional negative lead type zoom lens, in which a lens unit having a negative refractive power is located closest to the object side, it is easy to achieve a wide angle of view by providing a relatively long back focus. A negative lead type zoom lens like this has been widely used on a projection apparatus. However, if the negative lead type zoom lens, in which a lens unit having a negative refractive power is located closest to the object side, is to be provided with a long focal length, it becomes necessary to use a large-size lens.

On the other hand, Japanese Patent Application Laid-Open No. 2005-309061 and Japanese Patent Application Laid-Open No. 08-297243 discuss a positive-lead type zoom lens, in which a lens unit having a positive refractive power is located closest to the object side. The zoom lens discussed in Japanese Patent Application Laid-Open No. 2005-309061 and Japanese Patent Application Laid-Open No. 08-297243 includes five lens units including, in order from an enlargement side to a reduction side, a lens unit having a positive refractive power, a lens unit having a negative refractive power, a lens unit having a negative refractive power, a lens unit having a positive refractive power, and a lens unit having a positive refractive power. For variation of magnification, any predetermined lens unit or units of the five lens units are moved.

However, in the zoom lens discussed in Japanese Patent Application Laid-Open No. 2005-309061, the brightness may vary due to variation of the F-number (Fno), which may be caused when the zooming position is changed. In the zoom lens discussed in Japanese Patent Application Laid-Open No. 08-297243, variation of the Fno, which may occur when the zooming position is changed, is suppressed but the amount of distortion occurring during zooming from the wide-angle end to the telephoto end may greatly vary.

More specifically, in the zoom lens according to the above-described conventional methods, variation of the Fno cannot be effectively suppressed at the same time as suppressing the variation of distortion at the wide-angle end and at the telephoto end.

SUMMARY OF THE INVENTION

The present invention is directed to a zoom lens having a long back focus and high telecentricity, in which the Fno is substantially constant and less distortion occurs over the entire zooming range.

According to an aspect of the present invention, a zoom lens includes, in order from an enlargement side to a reduction side, a first lens unit having a positive refractive power, which is stationary for variation of magnification, a second lens unit having a negative refractive power, which moves for variation of magnification, a third lens unit having a negative refractive power, which moves for variation of magnification, a fourth lens unit having a positive refractive power, which includes a stop and which moves for variation of magnification, and at least one lens unit. In the zoom lens, for variation of magnification from a wide-angle end to a telephoto end, the second lens unit and the third lens unit move towards the reduction side and the fourth lens unit move towards the enlargement side. When $\beta t2$ is a lateral magnification of the second lens unit at the telephoto end and $\beta w2$ is a lateral magnification of the second lens unit at the wide-angle end, the following condition is satisfied:

$$0.5 < |\beta t2/\beta w2| < 1.0$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

Figure 1:
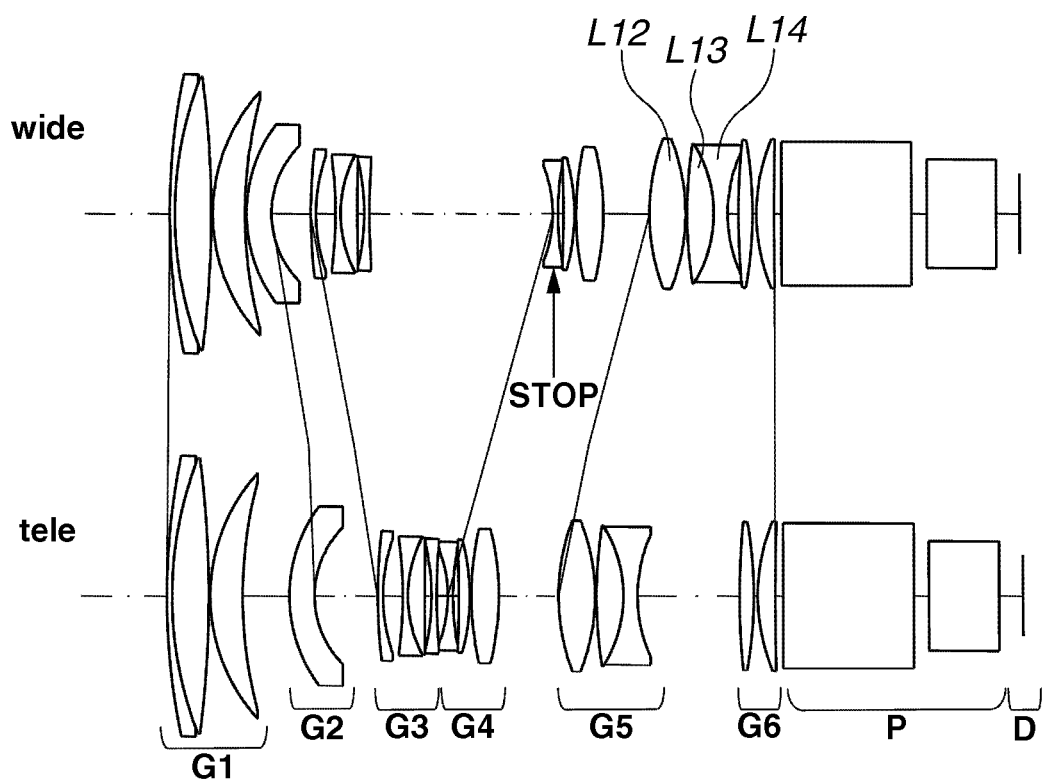
FIG. 1 is a cross section of a zoom lens according to a first exemplary embodiment of the present invention at the wide-angle end and the telephoto end.

FIG. 1 is a cross section of a zoom lens according to a first exemplary embodiment of the present invention at the wide-angle end and the telephoto end. Referring to FIG. 1, a first lens unit G1 having a positive refractive power is stationary for zooming and moves for object distance adjustment (focusing). A second lens unit G2 having a negative refractive power can move during zooming. A third lens unit G3 having a negative refractive power can move during zooming. A fourth lens unit G4 having a positive refractive power includes a stop and can move during zooming. A fifth lens unit G5 having a positive refractive power can move during zooming. A sixth lens unit G6 having a positive refractive power is stationary for variation of magnification.

In an exemplary embodiment of the present invention, the "stop" refers to a lens that regulates an F-number (Fno) or to an edge (supporting portion) of the lens. To more strictly describe a stop according to an exemplary embodiment of the present invention, the stop refers to a lens having an effective diameter smallest of the effective diameters of all lenses included in the zoom lens or to an edge (supporting portion) of the lens.

In each cross section of the zoom lens (FIGS. 1, 4, 6, and 8), "P" denotes a glass block, such as a color compositing prism. "D" denotes an image display element, which displays an original image to be displayed, such as a liquid crystal display (LCD) panel. The zoom lens according to an exemplary embodiment of the present invention is a zoom lens (projection optical system) for a projection apparatus, which is configured to project an image displayed by the image display element D on a screen (not illustrated). The color compositing prism P combines light from the image display element, which corresponds to each color light, and guides the composite light to the zoom lens.

Now, optical characteristics of the zoom lens according to the present exemplary embodiment will be described in detail below. To begin with, a relationship between each moving lens unit and the Fno will be described in detail.

In the present exemplary embodiment, for variation of magnification from a wide-angle end to a telephoto end, the second lens unit G2 and the third lens unit G3 move towards the reduction side (hereinafter may also be referred to as a "display element side") and. The fourth lens unit G4 and the fifth lens unit G5 move towards the enlargement side (hereinafter may also be referred to as a "screen side").

For variation of magnification, the third lens unit G3 contributes most to the increase of refractive powers among the moving lens units. On the other hand, while slightly decreasing the refractive powers, the second lens unit G2 corrects the position of the image plane together with the fourth lens unit G4 and the fifth lens unit G5.

For variation of magnification from the wide-angle end to the telephoto end, the second lens unit G2 moves towards the display element side. In this manner, an object point of the moving lens units including the third lens unit G3 and subsequent moving lens units is moved towards the screen side. Accordingly, the moving lens units including the fourth lens unit G4, including the stop, and subsequent moving lens units can move towards the screen side.

In order to achieve a small-size zoom lens, it is useful if a lateral magnification (variable magnification ratio) of the second lens unit G2 is positive over the entire zooming range. This is because if the lateral magnification (variable magnification ratio) of the second lens unit G2 is positive over the entire zooming range, the space between the first positive lens unit G1 and the second lens unit G2 can be set small.

In the zoom lens having the above-described configuration, the distance between the object point (a conjugate point on the screen side) of the fourth lens unit G4, which includes the stop, and the first lens surface of the fourth lens unit G4 on the screen side can become constant. Accordingly, the present exemplary embodiment having the above-described configuration can implement the zoom lens whose Fno is substantially constant over the entire zooming range.

As one of other effects of the present exemplary embodiment, the present exemplary embodiment can effectively suppress or at least reduce various aberrations by moving the fourth lens unit G4 and the fifth lens unit G5 (a rear lens group) towards the screen side for variation of magnification from the wide-angle end to the telephoto end. This effect will be described in detail below.

In order to implement the above-described movement of moving lens units and to achieve a zoom lens having a substantially constant Fno, it is useful if the following condition (1) is satisfied:

$$0.5 < |\beta t2/\beta w2| < 1.0 \tag{1}$$

It is further useful if the following condition (1a) is satisfied:

$$0.6 < |\beta t2/\beta w2| < 0.9 \tag{1a}$$

It is yet further useful if the following condition (1b) is satisfied:

$$0.7 < |\beta t2/\beta w2| < 0.8 \tag{1b}$$

In the above-described conditions (1), (1a), and (1b), "βw2" and "βt2" denote lateral magnifications of the second lens unit at the wide-angle end and at the telephoto end, respectively.

If the upper limit value or the lower limit value of the condition (1) is exceeded, the amount of aberrations may greatly vary at different zooming positions.

The zoom lens according to the present exemplary embodiment can satisfy the following condition:

$$0.9 < XW\beta W/XT\beta T < 1.1 \tag{2}$$

It is further useful if the following condition (2a) is satisfied:

$$0.95 < XW\beta W/XT\beta T < 1.05 \tag{2a}$$

In the above-described conditions (2) and (2a), XW is an air equivalent distance between a focal position of the lens units located on the enlargement side of the stop at the wide-angle end and the stop, βW is an overall image forming magnification of the lens units including the stop and located on the reduction side at the wide-angle end, XT is an air equivalent distance between a focal position of the lens units located on the enlargement side of the stop at the telephoto end and the stop, and βT is an overall image forming magnification of the lens units including the stop and located on the reduction side at the telephoto end.

In the present exemplary embodiment, the overall image forming magnification βW achieved by n lens units is defined by an expression "β1×β2×β3 . . . ×βn". Each exemplary embodiment, which satisfies the above-described conditions, can implement a zoom lens having a substantially constant Fno over the entire zooming range.

On the other hand, if the upper limit value or the lower limit value of the condition (2) is exceeded, it becomes impossible to achieve an Fno that is substantially constant over the entire zooming range. As a result, the brightness may vary.

Each exemplary embodiment, which satisfies the above-described conditions, corrects variation of distortion that may occur in the lens units located on the screen side of the stop (hereinafter may also be referred to as a "front lens group") for variation of magnification by moving the lens units including the stop and located on the display element side (hereinafter simply referred to as a "rear lens group"). More specifically, by moving the fifth lens unit including a negative lens having a high negative refractive power, the present exemplary embodiment appropriately controls the amount of distortion at different zooming positions. Accordingly, the present exemplary embodiment having the above-described configuration can implement a zoom lens having a substantially constant Fno over the entire zooming range, in which only a small amount of distortion may occur, and having a high image forming performance. The effect of the present exemplary embodiment will be described in detail below.

Figure 2:
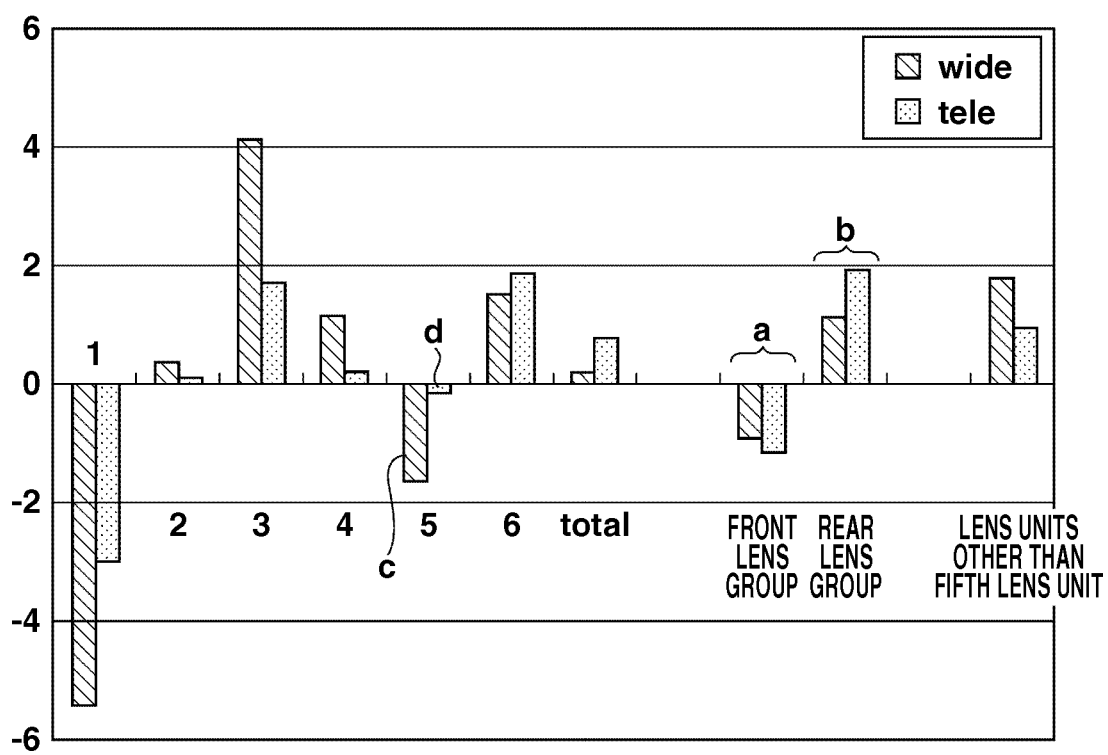
FIG. 2 is a graph illustrating aberration coefficients of the zoom lens according to the first exemplary embodiment of the present invention.

FIG. 2 is a graph illustrating third-order distortion coefficients of the zoom lens according to the present exemplary embodiment at the wide-angle end and at the telephoto end. To begin with, an exemplary method for correcting distortion that may occur on the front lens group and the rear lens group will be described in detail below.

During variation of magnification from the wide-angle end to the telephoto end, negative distortion occurring on the front lens group may increase (distortion coefficients "a" in FIG. 2). Suppose that distortion occurring on the rear lens group does not vary for variation of magnification. In this case, distortion in the entire zoom lens at different zooming positions may greatly vary. Accordingly, it becomes difficult to reduce the distortion over the entire zooming range.

In the present exemplary embodiment, during variation of magnification from the wide-angle end to the telephoto end, positive distortion on the rear lens group is increased (distortion coefficients b in FIG. 2) to reduce the distortion in the entire zooming range. In FIG. 2, the following coefficients are illustrated:

a: the sum of distortion coefficients for the lenses of the front lens group located in front of the stop at the wide-angle end and at the telephoto end;

b: the sum of distortion coefficients for the lenses of the rear lens group including the stop at the wide-angle end and at the telephoto end;

c: a distortion coefficient for the fifth lens unit at the wide-angle end; and d: a distortion coefficient for the fifth lens unit at the telephoto end.

The correction of distortion by the fifth lens unit at the wide-angle end will be described in detail below.

The fifth lens unit reduces the amount of distortion in the entire zoom lens by correcting positive distortion (pincushion distortion on the screen) on the lens units other than the fifth lens unit by generating negative distortion (barrel distortion on the screen) at the wide-angle end (the distortion coefficient c in FIG. 2). On the other hand, as illustrated with the distortion coefficient d in FIG. 2, the fifth lens unit reduces the amount of negative distortion occurring at the telephoto end to be smaller than the amount of the negative distortion at the wide-angle end. In this manner, the fifth lens unit also reduces the amount of distortion in the entire zoom lens at the telephoto end.

More specifically, the fifth lens unit is constituted by positive lenses L12 and L13 and a negative lens L14 and functions as a positive moving lens unit as a whole. The negative lens L14 greatly refracts incident light to generate distortion as intended. During variation of magnification, the fifth lens unit moves from the display element side towards the screen side. Accordingly, the height of an off-axis principal ray (the distance from the optical axis (hereinafter simply referred to as "h_")) is caused to vary. Furthermore, the amount of negative distortion is controlled. In this manner, the amount of distortion occurring on the fifth lens unit at the wide-angle end and at the telephoto end can be changed.

In order to achieve a zoom lens in which the amount of distortion in the entire zooming range is small, it is useful to satisfy the following condition (3):

$$1.0 < |\phi m/\phi w| < 3.0 \quad (3)$$

It is further useful to satisfy the following condition (3a):

$$1.5 < |\phi m/\phi w| < 2.0 \quad (3a)$$

In addition, the present exemplary embodiment can satisfy the following condition (4) to effectively reduce the amount of distortion in the entire zooming range:

$$0.05 < Lc/L < 0.3 \quad (4)$$

It is yet further useful to satisfy the following condition (4a):

$$0.1 < Lc/L < 0.2 \quad (4a)$$

In the above-described conditions (3) and (3a), $\phi m$ is the highest power in absolute value of powers of negative lenses located on the display element side of the stop and $\phi w$ is the power of the entire zoom lens at the wide-angle end. In the above-described conditions (4) and (4a), L is the lens total length (excluding the prism) and Lc is the difference between a position at the wide-angle end and a position at the telephoto end of the moving lens unit, which includes the negative lens. Herein, the negative lens is a negative lens having the highest power in absolute value of powers of negative lenses located on the display element side of the stop.

If the lower limit value of the condition (3) is exceeded, the effect of correcting the distortion for the distance of movement of each moving lens unit may decrease. On the other hand, if the upper limit value of the condition (3) is exceeded, distortion may occur. Furthermore, if the lower limit value of the condition (4) is exceeded, the distance of movement of each moving lens unit may decrease. Accordingly, the distortion cannot be effectively corrected. On the other hand, if the upper limit value of the condition (4) is exceeded, it becomes necessary to use a large-size lens.

In addition, it is useful to provide the negative lens which is located on the reduction conjugate side of the stop and which contributes to the correction of distortion as close to the display element side as possible. This is because the closer to the display element side the negative lens is located, the higher the height h_, which is the height of incidence of the light incident on the negative lens, becomes. As a result, in this case, the effect of correcting distortion may become higher.

In the present exemplary embodiment, the negative lens L14 is located closest to the display element side among the lenses of the fifth lens unit to generate large distortion as intended.

Figure 3:
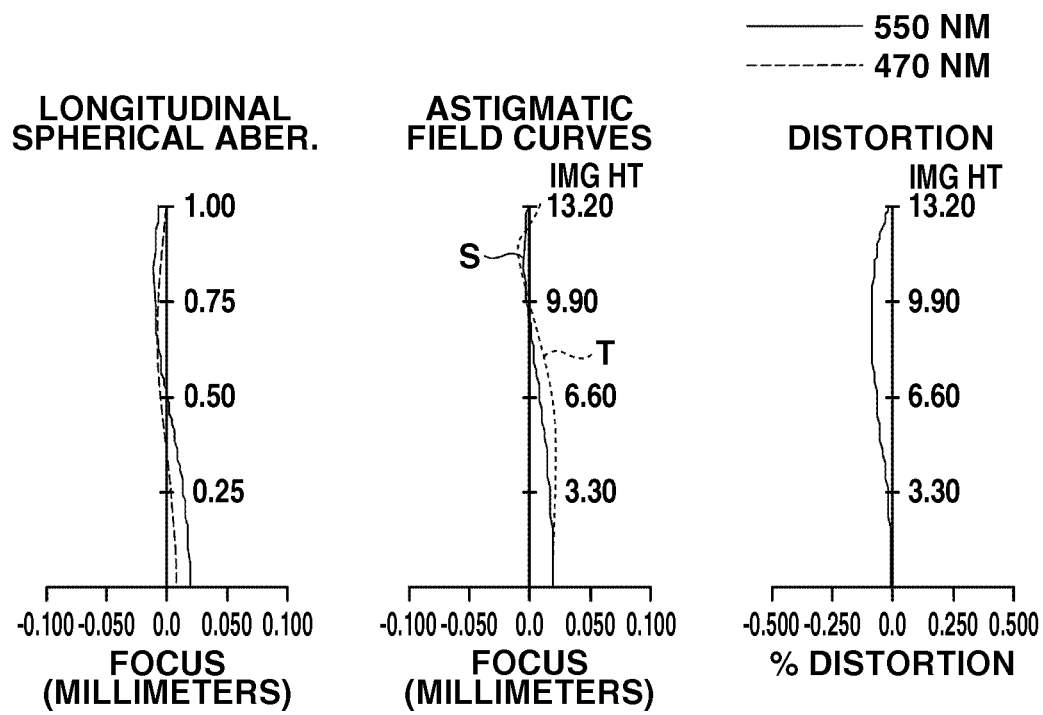
FIG. 3 is an aberration chart illustrating various aberrations that may occur on the zoom lens according to the first exemplary embodiment of the present invention.
Figure 3:
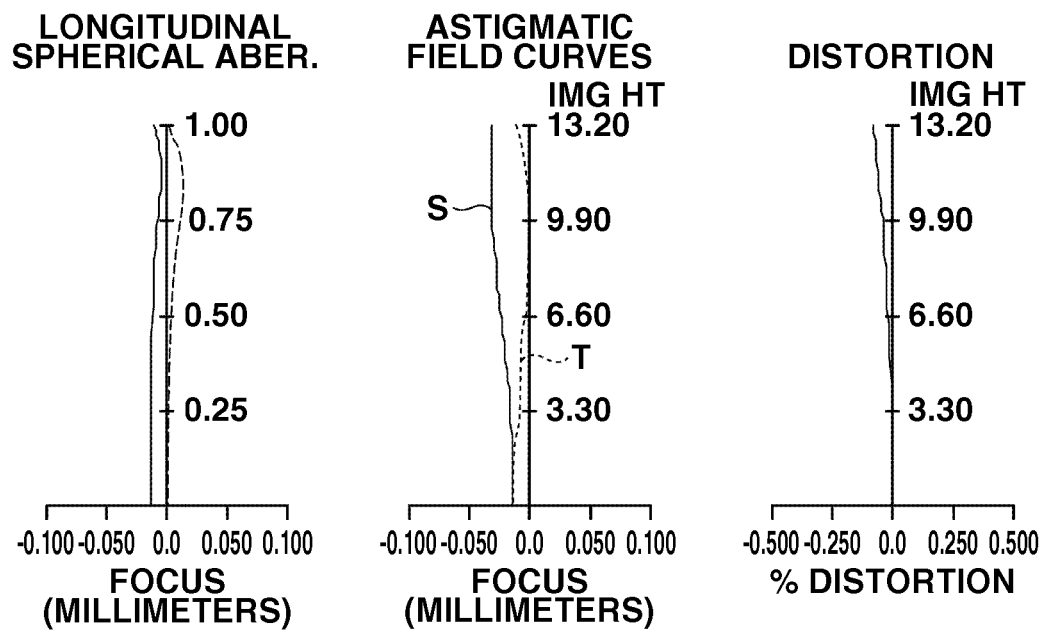

FIG. 3 is an aberration chart illustrating characteristics of various aberrations that may occur on the zoom lens according to the first exemplary embodiment of the present invention. In each aberration chart in FIG. 3, spherical aberration, astigmatism (curvature of field), and distortion (%) are illustrated. Charts in the upper portion of FIG. 3 illustrate aberrations at the wide-angle end while aberrations at the telephoto end are illustrated in the lower portion of FIG. 3. In FIG. 3, a solid line indicates spherical aberration with respect to light of wavelength of 550 nm, while a broken line indicates spherical aberration with respect to light of wavelength of 470 nm. With regard to astigmatism, a solid line (S) denotes a sagittal image plane, and a broken line (T) denotes a meridional image plane.

In the present exemplary embodiment, the Fno has a substantially constant value of about 2.0 at each position at the wide-angle end and the telephoto end. In addition, various aberrations are effectively suppressed for the entire zooming range. In particular, distortion can be effectively suppressed.

With the above-described configuration, the present exemplary embodiment can achieve a zoom lens capable of maintaining substantially constant brightness while suppressing distortion during zooming.

A second exemplary embodiment of the present invention has a simple configuration, in which one moving lens unit is located on the display element side of the moving lens unit including the stop. The detailed description of configurations of the present exemplary embodiment similar to those of the first exemplary embodiment described above will not be repeated here.

Figure 4:
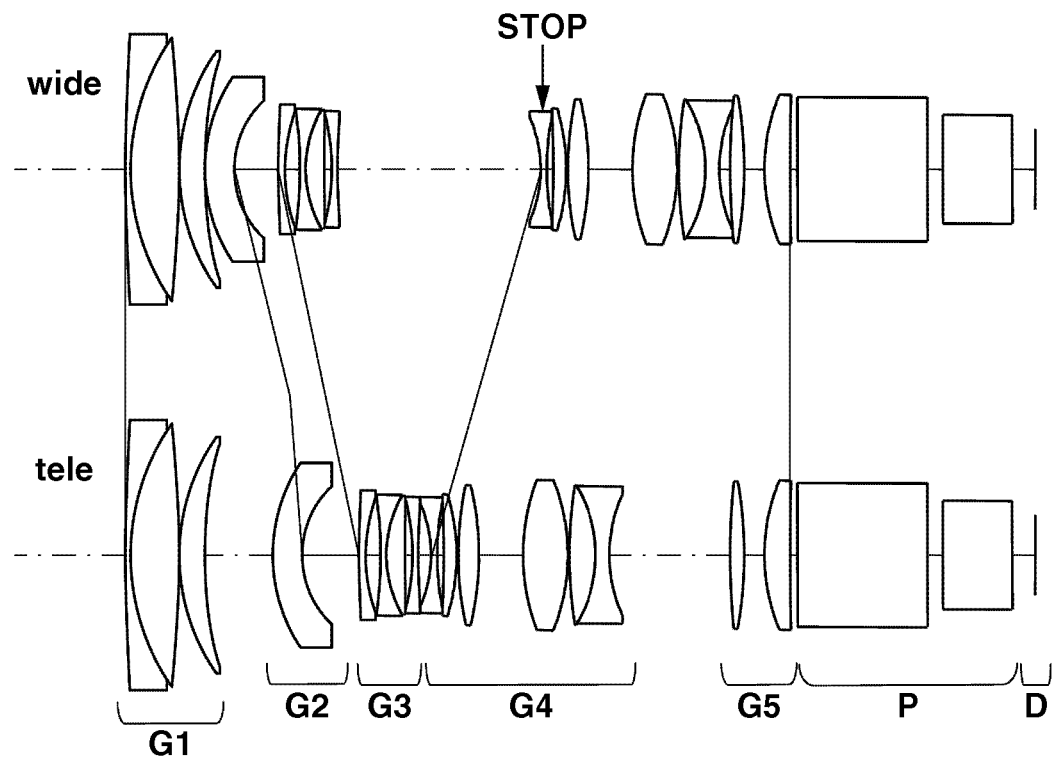
FIG. 4 is a cross section of a zoom lens according to a second exemplary embodiment of the present invention.
Figure 5:
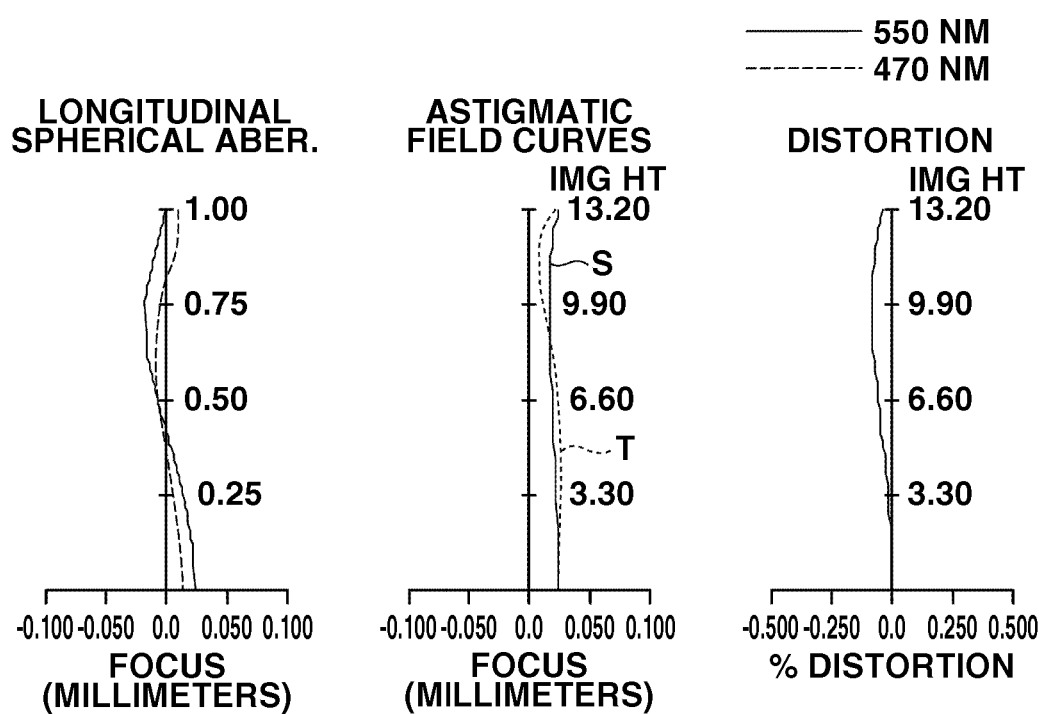
FIG. 5 is an aberration chart illustrating various aberrations that may occur on the zoom lens according to the second exemplary embodiment of the present invention.
Figure 5:
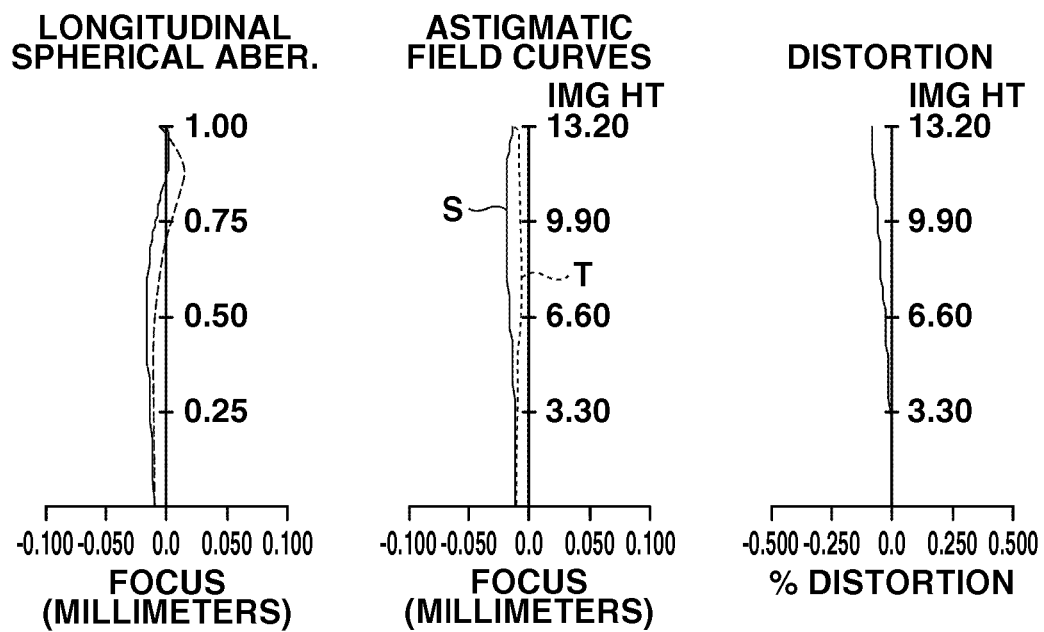

FIG. 4 is a cross section of the zoom lens according to the present exemplary embodiment. FIG. 5 is an aberration chart illustrating various aberrations that may occur on the zoom lens according to the second exemplary embodiment.

Referring to FIG. 4, the zoom lens according to the present exemplary embodiment includes a first lens unit having a positive refractive power and a second lens unit having a negative refractive power. The first lens unit is stationary for zooming but moves for distance adjustment (focusing). The second lens unit can move during zooming.

In addition, the zoom lens includes a third lens unit having a negative refractive power, a fourth lens unit having a positive refractive power, and a fifth lens unit having a positive refractive power. The third lens unit can move during zooming. The fourth lens unit includes a stop and can move during zooming. The fifth lens unit is stationary for variation of magnification. As described above, the zoom lens according to the present exemplary embodiment is a five-unit zoom lens.

In the present exemplary embodiment, for variation of magnification from the wide-angle end to the telephoto end, the second lens unit and the third lens unit move towards the display element side (the reduction side), while the fourth lens unit moves towards the screen side (the enlargement side).

It is not necessary for the lens units that move for zooming in the first and the second exemplary embodiments to always move during zooming from the wide-angle end to the telephoto end. In other words, it is useful if a part of the lens units move during zooming.

Figure 6:
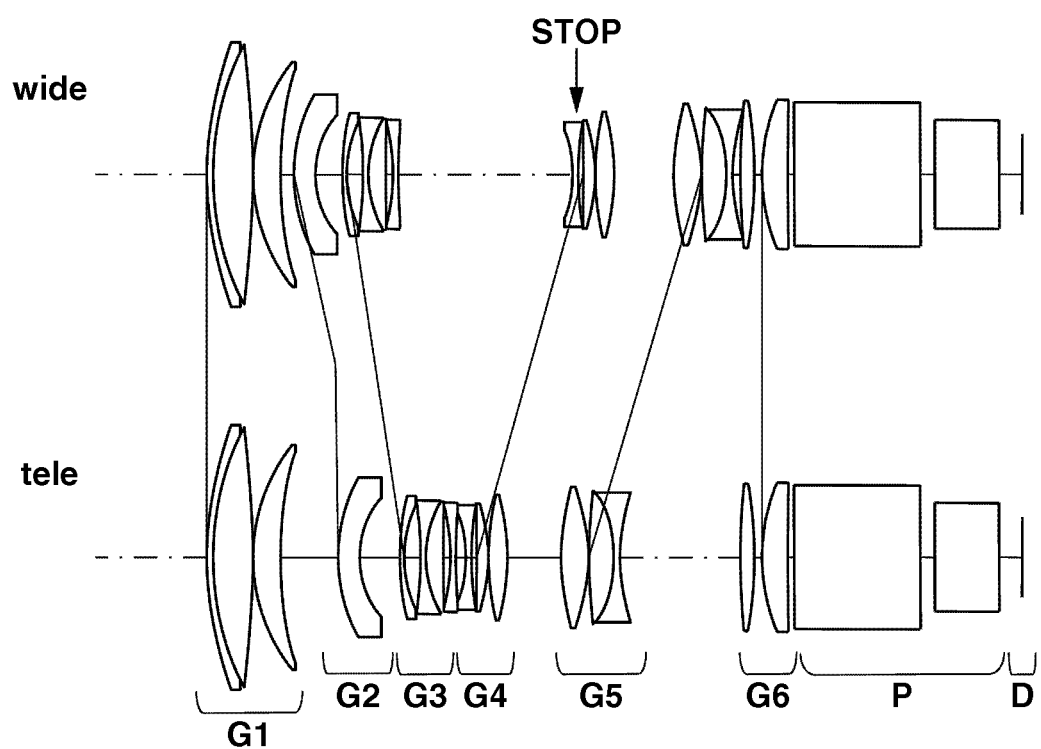
FIG. 6 is a cross section of a zoom lens according to a third exemplary embodiment of the present invention.
Figure 7:
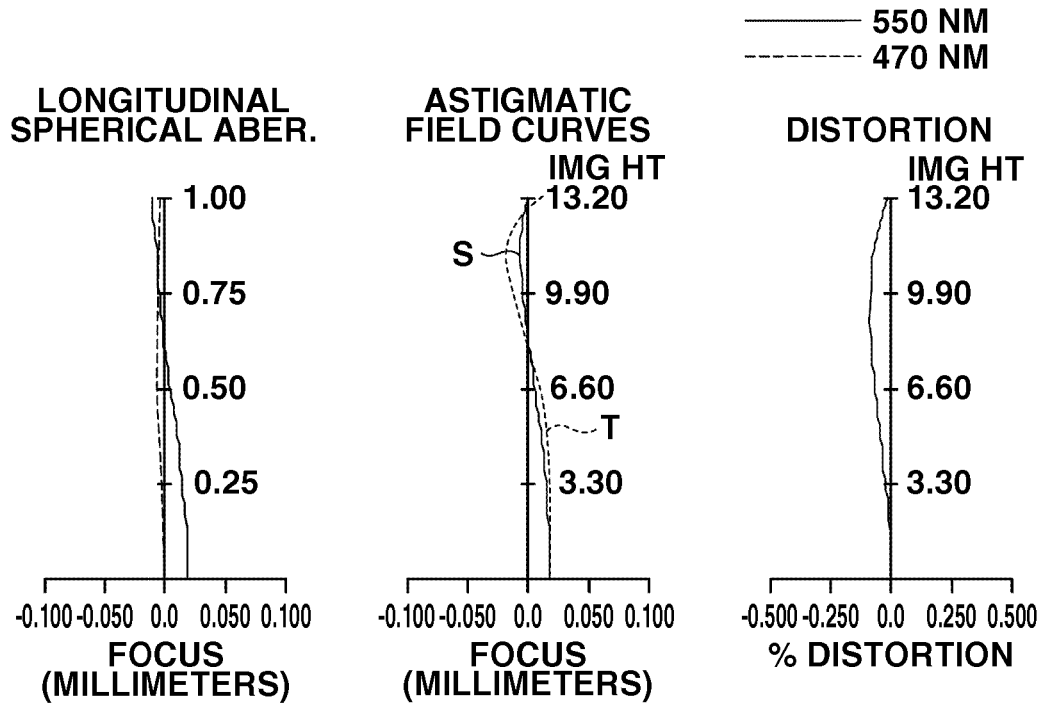
FIG. 7 is an aberration chart illustrating various aberrations that may occur on the zoom lens according to the third exemplary embodiment of the present invention.
Figure 7:
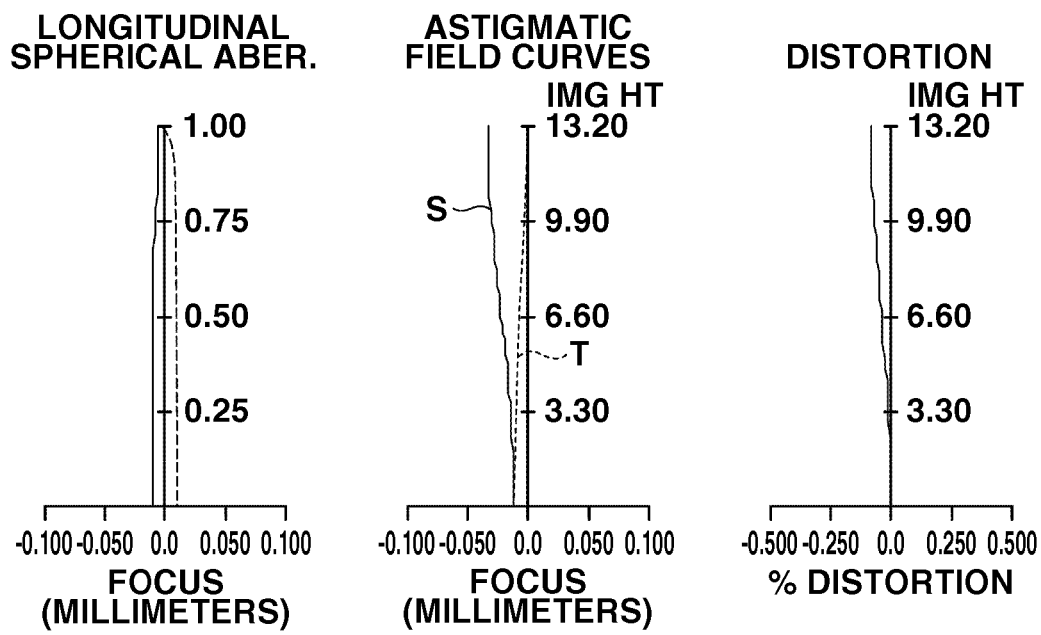

Now, a third exemplary embodiment will be described in detail below. FIG. 6 is a cross section of the zoom lens according to the third exemplary embodiment of the present invention at the wide-angle end and the telephoto end. FIG. 7 is an aberration chart illustrating various aberrations that may occur on the zoom lens according to the present exemplary embodiment.

Referring to FIG. 6, the zoom lens according to the present exemplary embodiment includes a first lens unit having a positive refractive power, a second lens unit having a negative refractive power, a third lens unit having a negative refractive power, a fourth lens unit having a positive refractive power, a fifth lens unit having a negative refractive power, and a sixth lens unit having a positive refractive power. The first lens unit is stationary for zooming but moves for distance adjustment (focusing). The second lens unit and the third lens unit can move during zooming. The fourth lens unit includes a stop and can move during zooming. The fifth lens unit can move during zooming. The sixth lens unit is stationary for variation of magnification. As described above, the zoom lens according to the present exemplary embodiment is a six-unit zoom lens.

Figure 8:
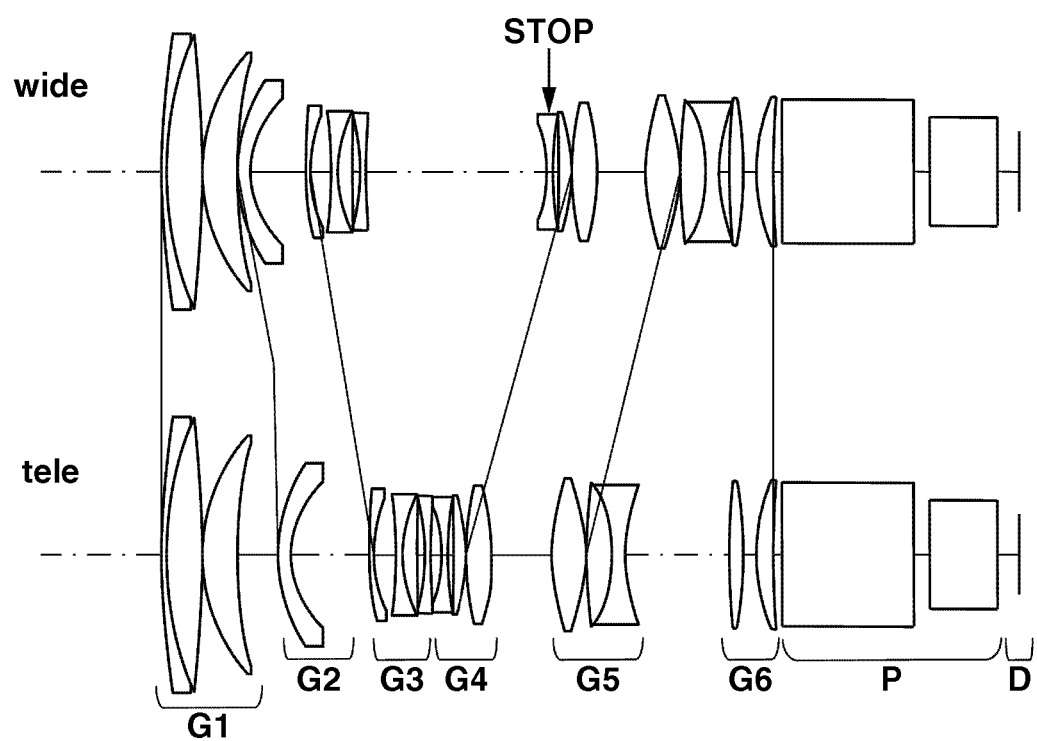
FIG. 8 is a cross section of a zoom lens according to a fourth exemplary embodiment of the present invention.
Figure 9:
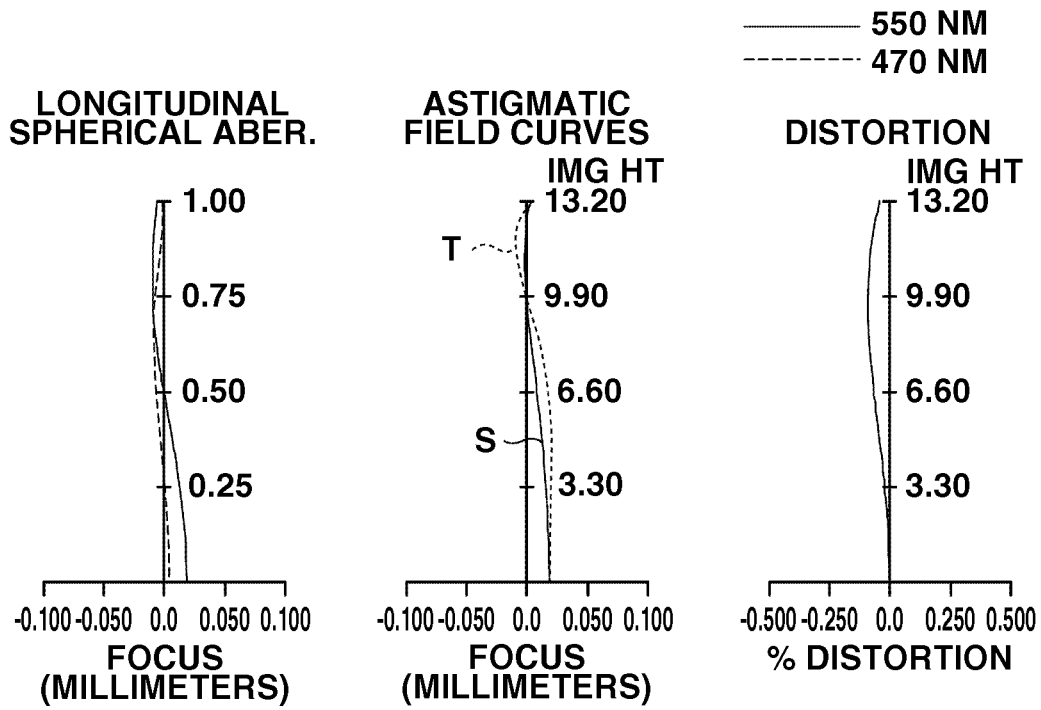
FIG. 9 is an aberration chart illustrating various aberrations that may occur on the zoom lens according to the fourth exemplary embodiment of the present invention.
Figure 9:
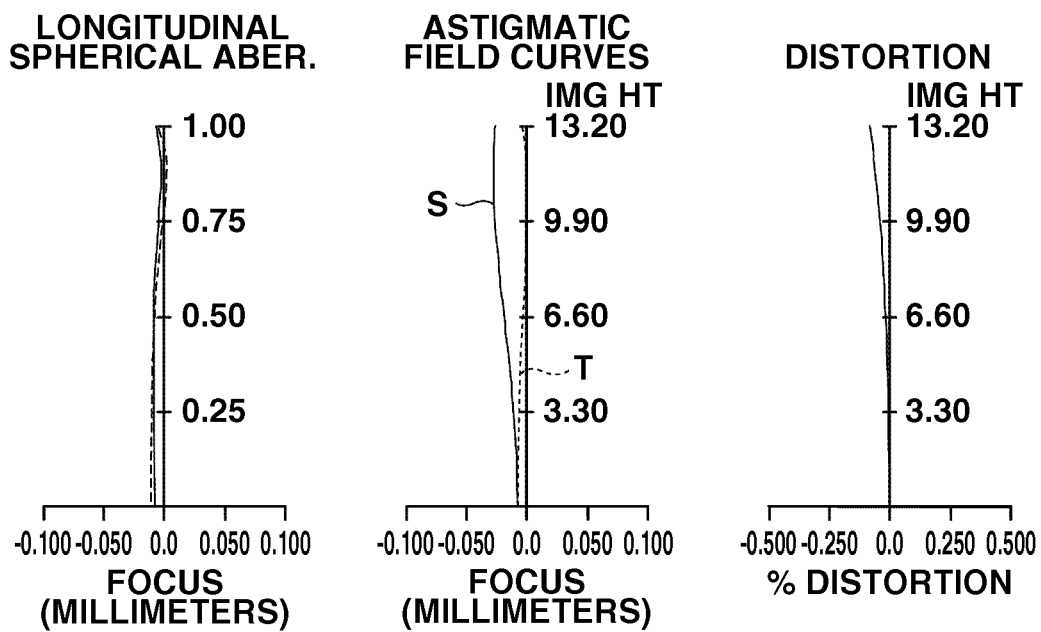

FIG. 8 is a cross section of the zoom lens according to a fourth exemplary embodiment of the present invention. FIG. 9 is an aberration chart illustrating various aberrations that may occur on the zoom lens according to the present exemplary embodiment.

Referring to FIG. 8, the zoom lens according to the present exemplary embodiment includes a first lens unit having a positive refractive power, a second lens unit having a negative refractive power, a third lens unit having a negative refractive power, a fourth lens unit having a positive refractive power, a fifth lens unit having a positive refractive power, and a sixth lens unit having a positive refractive power. The first lens unit is stationary for zooming but moves for distance adjustment (focusing). The second lens unit and the third lens unit can move during zooming. The fourth lens unit includes a stop and can move during zooming. The fifth lens unit can move during zooming. The sixth lens unit is stationary for variation of magnification. As described above, the zoom lens according to the present exemplary embodiment is a six-unit zoom lens.

As described above, as one effect of the present invention, the present invention can achieve a zoom lens capable of suppressing distortion over the entire zooming range while effectively suppressing variation of Fno at the same time. As another effect of the present invention, the present invention can achieve a zoom lens having a high image forming performance and capable of suppressing distortion over the entire zooming range while effectively suppressing variation of Fno at the same time. As yet another effect of the present invention, if the zoom lens of the present invention is used on a projection apparatus, a projection image in which substantially no distortion occurs in the entire zooming range and which has a constant brightness can be achieved.

The zoom lens of the present invention can be applied to an image projection apparatus configured to project a light flux of an image from a light modulation element, such as an LCD panel or a micro mirror device as a projection lens thereof. In addition, the zoom lens of the present invention can be applied to an image pickup apparatus configured to form an object image on an image sensor or a film as a photographic lens thereof.

For example, an image projection apparatus of the present invention includes a light source, an LCD panel, an illumination optical system configured to guide irradiation light from the light source to the LCD panel, and a projection lens (the above-described zoom lens of the present invention) configured to project a light flux of an image from the LCD panel onto a projection target surface, such as a screen. The image projection apparatus of the present invention described above can project an image including only a small amount of distortion in the entire zooming range (the entire zooming range from the wide-angle end to the telephoto end) on the projection target surface.

Figure 10:
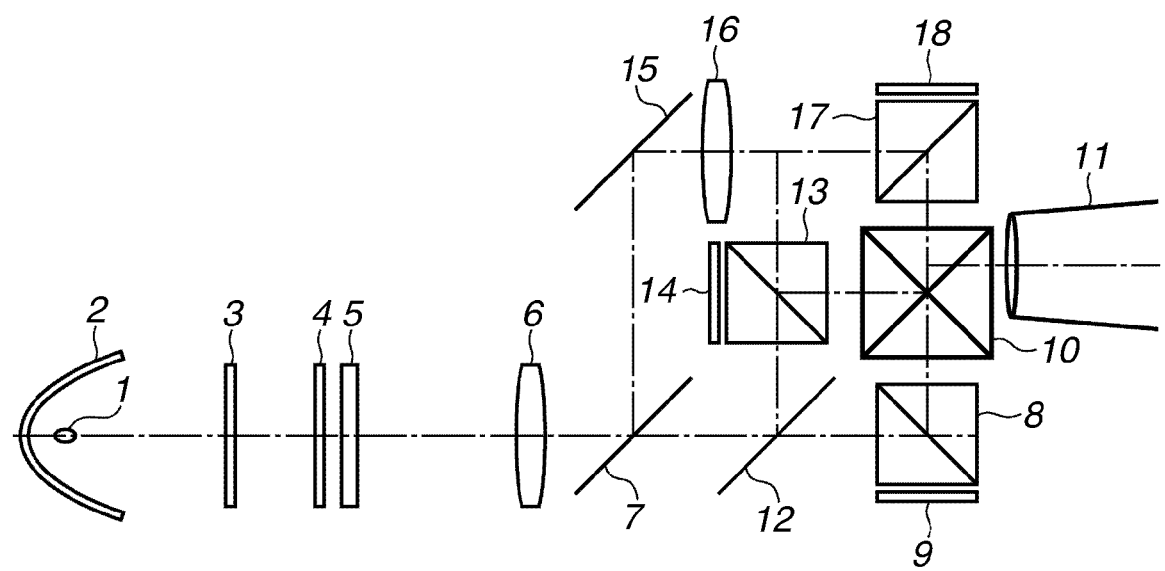
FIG. 10 illustrates an example of an image projection apparatus to which a zoom lens according to an exemplary embodiment of the present invention is applied.

FIG. 10 illustrates an example of an image projection apparatus to which a zoom lens according to an exemplary embodiment of the present invention is applied. White light emitted from a light source 1 is reflected by a paraboloid reflector 2. The reflected light from the paraboloid reflector 2 is split into a plurality of light fluxes by a first lens array 3, which includes a plurality of lenses two-dimensionally arrayed. The split light flexes from the first lens array 3 pass through a second lens array 4 and then forms a plurality of light source images on the vicinity of a polarization conversion element 5.

Light fluxes entering the polarization conversion element 5 are aligned in polarization direction to change from non-polarized light to linear polarized light and are then superposed on one another on liquid crystal panels 9, 14, and 18 by a condenser lens 6, so that the liquid crystal panels 9, 14, and 18 are illuminated with the superposed light fluxes. In the present exemplary embodiment, the polarization conversion element 5 aligns polarization directions of incident light fluxes such that the light fluxes become s-polarized light with respect to the polarization separation surfaces of polarizing beam splitters 8, 13, and 17.

The liquid crystal panels 9, 14, and 18 deal with light fluxes of green, red, and blue wavelength bands, respectively. The light source 1 through the condenser lens 6 constitute an illumination optical system.

Light fluxes exiting the illumination optical system enter a dichroic mirror (color separation element) 7, which has a function to separate optical paths according to wavelength bands. The dichroic mirror 7 transmits light fluxes of green and red wavelength bands and reflects a light flux of blue wavelength band.

A dichroic mirror 12 transmits light fluxes of blue and green wavelength bands and reflects a light flux of red wavelength band. The dichroic mirror 12 may be configured to have a characteristic to reflect a light flux of blue wavelength band.

The light flux of green wavelength band passes through the dichroic mirror 7 and the dichroic mirror 12 according to the characteristics of the dichroic mirror 7 and the dichroic mirror 12. Then, the light flux of green wavelength band enters the polarizing beam splitter 8 as s-polarized light and is thus reflected by the polarizing beam splitter 8 to illuminate the liquid crystal panel 9. The liquid crystal panel 9 has a function to reflect incident light while changing (modulating) a polarization state of the incident light. The liquid crystal panels 14 and 18 also have the same function as the liquid crystal panel 9. Image light (p-polarized light component) modulated by the liquid crystal panel 9 passes through the polarizing beam splitter 8 and is then reflected by a color separation surface (dichroic surface) of a combining prism (color combining element or optical path combining element) 10 to be guided to a zoom lens (projection lens or projection optical system) 11. Then, the image light is magnified and projected on a screen (projection surface) by the zoom lens 11. Herein, the image light is light guided to the zoom lens 11 while being changed in polarization state. On the other hand, polarized light other than the image light is returned towards the light source 1.

The light flux of blue wavelength band reflected by the dichroic mirror 7 is further reflected by a reflection mirror 15 and is then guided to the polarizing beam splitter 17 through a relay lens 16. Then, the reflected light flux of blue wavelength band is reflected by the polarizing beam splitter 17 to illuminate the liquid crystal panel 18. Image light, out of light whose polarization state is changed by the liquid crystal panel 18, passes through the polarizing beam splitter 17 and is then reflected by the color separation surface of the combining prism 10. The reflected image light is magnified and projected on the screen by the zoom lens 11.

The light flux of red wavelength band passing through the dichroic mirror 7 is reflected by the dichroic mirror 12. The reflected light flux of red wavelength band is further reflected by the polarizing beam splitter 13 to illuminate the liquid crystal panel 14. Image light, out of light whose polarization state is changed by the liquid crystal panel 14, passes through the polarizing beam splitter 13 and the color separation surface of the combining prism 10 and is then magnified and projected on the screen by the zoom lens 11.

In the above description, the configuration except the zoom lens 11 is referred to as an image projection apparatus body, and the configuration including the zoom lens 11 is referred to as an image projection apparatus.

As described above, employing a zoom lens according to an exemplary embodiment of the present invention as a projection lens enables a clear and fine image to be projected.

In each exemplary embodiment of the present invention, the first lens unit is stationary for variation of magnification. However, the first lens unit can move for focusing. Furthermore, as described above, each exemplary embodiment of the present invention is a five-unit or a six-unit zoom lens. However, alternatively, a lens having a low refractive power can be located between the lens units.

In addition, it is further useful if, for variation of magnification from the wide-angle end to the telephoto end, the second lens unit and the third lens unit move monotonously towards the reduction side while the fourth lens unit moves monotonously towards the enlargement side.

Numerical examples 1 through 4, which respectively correspond to the first through the fourth exemplary embodiments of the present invention, are set forth below. In each of the numerical examples 1 through 4, "f" denotes a focal length and "Fno" denotes an F-number. "ri" denotes a radius of curvature of the i-th surface from the object side, "di" denotes an axial space between the i-th surface and the (i+1)-th surface, "ni" and "vi" respectively denote a refractive index and an Abbe number of the i-th optical member from the object side with respect to d-line light. The half angle of view is described in the unit of an angle ("°").

Numerical Example 1

Unit: mm
f = 55.5-112.2 Fno = 2.0-2.0 Zoom ratio: 2.0

Surface Data

| Surface No. | r | d | n | v |
|---|---|---|---|---|
| 1 | 226.929 | 1.70 | 1.80500 | 25.4 |
| 2 | 123.949 | 12.04 | 1.59570 | 60.5 |
| 3 | −353.548 | 0.50 | | |
| 4 | 59.378 | 10.67 | 1.49700 | 81.5 |
| 5 | 145.000 | Variable | | |
| 6 | 48.905 | 8.27 | 1.77354 | 49.4 |
| 7 | 31.481 | Variable | | |
| 8 | 179.776 | 1.70 | 1.49814 | 64.1 |
| 9 | 55.579 | 6.50 | | |
| 10 | −135.000 | 1.70 | 1.49346 | 66.3 |
| 11 | 41.531 | 5.53 | 1.82958 | 34.8 |
| 12 | 978.174 | 2.24 | | |
| 13 | −74.906 | 1.70 | 1.57171 | 42.3 |
| 14 | 210.908 | Variable | | |
| 15 | −41.246 | 1.70 | 1.72416 | 37.1 |
| 16 | 86.206 | 1.85 | | |
| 17 | −539.073 | 3.65 | 1.70795 | 54.5 |
| 18 | −67.957 | 0.53 | | |
| 19 | 98.301 | 9.00 | 1.80500 | 25.4 |
| 20 | −88.981 | Variable | | |
| 21 | 69.107 | 12.00 | 1.49700 | 81.5 |
| 22 | −65.744 | 0.50 | | |
| 23 | 150.798 | 8.81 | 1.49700 | 81.5 |
| 24 | −43.038 | 4.62 | 1.72016 | 32.3 |
| 25 | 48.078 | Variable | | |
| 26 | 246.574 | 4.64 | 1.48700 | 70.2 |
| 27 | −136.913 | 1.32 | | |
| 28 | 63.234 | 5.75 | 1.70232 | 55.0 |
| 29 | 903.292 | 2.50 | | |
| 30 | ∞ | 43.00 | 1.51633 | 64.1 |
| 31 | ∞ | 5.00 | | |
| 32 | ∞ | 23.00 | 1.80518 | 25.4 |
| 33 | ∞ | 7.24 | | |

| | Wide-Angle End | Middle Focal Length | Telephoto End |
|---|---|---|---|

Various Data
Zoom ratio: 2.0

| Half Angle Of View | 13.4181 | 8.4027 | 6.712 |
|---|---|---|---|

Distance Between Lens Units

| Focal Lengths | 55.5 | 89.5 | 112.2 |
|---|---|---|---|
| d5 | 0.50 | 12.58 | 15.33 |
| d7 | 13.03 | 15.69 | 20.81 |
| d14 | 60.72 | 25.27 | 3.67 |

-continued

Unit: mm
f = 55.5-112.2 Fno = 2.0-2.0 Zoom ratio: 2.0

| | | | |
|---|---|---|---|
| d20 | 15.27 | 16.59 | 19.67 |
| d25 | 3.57 | 22.97 | 33.60 |

Numerical Example 2

Unit: mm
f = 55.2-111.7 Fno = 2.0-2.0 Zoom ratio: 2.0

Surface Data

| Surface No. | r | d | n | ν |
|---|---|---|---|---|
| 1 | 585.42 | 1.90 | 1.747 | 27.49 |
| 2 | 81.40 | 15.28 | 1.818 | 39.65 |
| 3 | −514.41 | 0.50 | | |
| 4 | 71.90 | 7.92 | 1.497 | 81.55 |
| 5 | 145.00 | Variable | | |
| 6 | 58.96 | 9.69 | 1.487 | 70.20 |
| 7 | 33.49 | Variable | | |
| 8 | 405.12 | 1.90 | 1.502 | 62.13 |
| 9 | 52.98 | 4.99 | | |
| 10 | −135.00 | 1.90 | 1.491 | 67.86 |
| 11 | 42.35 | 6.95 | 1.773 | 49.60 |
| 12 | −280.37 | 1.96 | | |
| 13 | −68.75 | 1.90 | 1.522 | 64.73 |
| 14 | 445.19 | Variable | | |
| 15 | −41.13 | 1.90 | 1.753 | 37.21 |
| 16 | 96.58 | 2.50 | | |
| 17 | −484.52 | 4.14 | 1.749 | 51.20 |
| 18 | −71.20 | 0.50 | | |
| 19 | 118.51 | 7.03 | 1.805 | 25.40 |
| 20 | −82.23 | 14.19 | | |
| 21 | 63.88 | 15.00 | 1.497 | 81.55 |
| 22 | −69.76 | 0.50 | | |
| 23 | 171.35 | 9.19 | 1.497 | 81.55 |
| 24 | −43.37 | 3.00 | 1.730 | 32.03 |
| 25 | 48.57 | Variable | | |
| 26 | 132.49 | 6.72 | 1.487 | 70.20 |
| 27 | −108.28 | 6.44 | | |
| 28 | 71.55 | 7.61 | 1.688 | 55.87 |
| 29 | 263.69 | 2.50 | | |
| 30 | ∞ | 43.00 | 1.516 | 64.14 |
| 31 | ∞ | 5.00 | | |
| 32 | ∞ | 23.00 | 1.805 | 25.43 |
| 33 | ∞ | 6.50 | | |

| | Wide-Angle End | Middle Focal Length | Telephoto End |
|---|---|---|---|
| Distance Between Lens Units | | | |
| Focal Lengths | 55.2 | 89.0 | 111.7 |
| d5 | 0.50 | 18.74 | 23.03 |
| d7 | 14.21 | 12.78 | 17.88 |
| d14 | 66.14 | 27.27 | 3.84 |
| d25 | 2.90 | 24.96 | 39.00 |
| Various Data | | | |
| Half Angle Of View | 13.4 | 8.4 | 6.7 |

Numerical Example 3

Unit: mm
f = 55.3-111.9 Fno = 2.0-2.0 Zoom ratio: 2.0

Surface Data

| Surface No. | r | d | n | ν |
|---|---|---|---|---|
| 1 | 127.98 | 1.80 | 1.805 | 25.40 |
| 2 | 101.05 | 13.48 | 1.487 | 70.20 |
| 3 | −372.91 | 0.50 | | |
| 4 | 61.12 | 9.58 | 1.497 | 81.55 |
| 5 | 145.00 | Variable | | |
| 6 | 69.67 | 7.00 | 1.523 | 53.65 |
| 7 | 30.12 | Variable | | |
| 8 | 80.91 | 1.80 | 1.487 | 70.20 |
| 9 | 46.26 | 5.10 | | |
| 10 | −135.00 | 1.80 | 1.487 | 70.20 |
| 11 | 36.18 | 6.00 | 1.834 | 37.20 |
| 12 | 389.87 | 2.88 | | |
| 13 | −68.09 | 1.80 | 1.692 | 30.21 |
| 14 | 824.81 | Variable | | |
| 15 | −40.08 | 1.80 | 1.787 | 33.22 |
| 16 | 102.24 | 1.74 | | |
| 17 | −353.61 | 3.69 | 1.830 | 35.22 |
| 18 | −66.70 | 0.50 | | |
| 19 | 99.40 | 6.49 | 1.805 | 25.40 |
| 20 | −78.62 | Variable | | |
| 21 | 81.70 | 9.41 | 1.497 | 81.55 |
| 22 | −64.64 | 0.50 | | |
| 23 | 212.80 | 8.43 | 1.497 | 81.55 |
| 24 | −43.23 | 1.80 | 1.753 | 29.82 |
| 25 | 60.00 | Variable | | |
| 26 | 208.41 | 4.91 | 1.697 | 55.50 |
| 27 | −174.53 | 2.90 | | |
| 28 | 72.85 | 8.70 | 1.773 | 49.60 |
| 29 | 332.17 | 2.50 | | |
| 30 | ∞ | 43.00 | 1.516 | 64.14 |
| 31 | ∞ | 5.00 | | |
| 32 | ∞ | 23.00 | 1.805 | 25.43 |
| 33 | ∞ | 7.08 | | |

| | Wide-Angle End | Middle Focal Length | Telephoto End |
|---|---|---|---|
| Distance Between Lens Units | | | |
| Focal Lengths | 55.3 | 89.2 | 111.9 |
| d5 | 5.00 | 16.58 | 19.86 |
| d7 | 8.90 | 10.62 | 14.10 |
| d14 | 60.39 | 25.27 | 3.33 |
| d20 | 20.46 | 17.55 | 18.46 |
| d25 | 2.65 | 27.40 | 41.65 |
| Various Data | | | |
| Half Angle Of View | 13.4 | 8.4 | 6.7 |

Numerical Example 4

Unit: mm
f = 55.5-112.1 Fno = 2.0-2.0 Zoom ratio: 2.0

Surface Data

| Surface No. | r | d | n | ν |
|---|---|---|---|---|
| 1 | 269.95 | 1.80 | 1.805 | 25.40 |
| 2 | 123.36 | 11.11 | 1.697 | 55.50 |

-continued

Unit: mm
f = 55.5-112.1 Fno = 2.0-2.0 Zoom ratio: 2.0

| | | | | |
|---|---|---|---|---|
| 3 | −462.04 | 0.50 | | |
| 4 | 56.90 | 10.88 | 1.497 | 81.55 |
| 5 | 145.00 | Variable | | |
| 6 | 51.82 | 4.60 | 1.626 | 58.76 |
| 7 | 32.80 | Variable | | |
| 8 | 215.60 | 1.80 | 1.487 | 70.20 |
| 9 | 50.95 | 7.17 | | |
| 10 | −114.06 | 1.80 | 1.487 | 70.20 |
| 11 | 43.62 | 5.63 | 1.833 | 36.61 |
| 12 | −2997.25 | 2.07 | | |
| 13 | −73.54 | 1.80 | 1.570 | 42.49 |
| 14 | 262.48 | Variable | | |
| 15 | −41.05 | 1.80 | 1.726 | 35.54 |
| 16 | 88.17 | 1.93 | | |
| 17 | −504.50 | 3.83 | 1.773 | 49.60 |
| 18 | −68.49 | 0.50 | | |
| 19 | 95.95 | 8.06 | 1.805 | 25.40 |
| 20 | −88.46 | Variable | | |
| 21 | 68.75 | 10.93 | 1.497 | 81.55 |
| 22 | −66.27 | 0.50 | | |
| 23 | 157.14 | 8.57 | 1.497 | 81.55 |
| 24 | −42.88 | 4.11 | 1.723 | 31.38 |
| 25 | 47.32 | Variable | | |
| 26 | 312.70 | 4.28 | 1.487 | 70.20 |
| 27 | −142.87 | 4.35 | | |
| 28 | 62.58 | 5.51 | 1.737 | 52.07 |
| 29 | 555.23 | 2.50 | | |
| 30 | ∞ | 43.00 | 1.516 | 64.14 |
| 31 | ∞ | 5.00 | | |
| 32 | ∞ | 23.00 | 1.805 | 25.43 |
| 33 | ∞ | 6.50 | | |

| | Wide-Angle End | Middle Focal Length | Telephoto End |
|---|---|---|---|
| Distance Between Lens Units | | | |
| Focal Lengths | 55.5 | 87.7 | 112.1 |
| d5 | 0.50 | 10.99 | 13.62 |
| d7 | 17.34 | 19.99 | 25.22 |
| d14 | 59.30 | 25.98 | 3.65 |
| d20 | 15.69 | 17.03 | 19.96 |
| d25 | 3.61 | 22.45 | 34.00 |
| Various Data | | | |
| Half Angle Of View | 13.4 | 8.5 | 6.7 |

The relationship between values of the above-described conditions (1) through (4) and the above-described numerical examples 1 through 4 are illustrated in the following Table 1. Table 2 illustrates variable magnification ratios of the second lens unit at the wide-angle end, the middle focal length (between the wide-angle end and the telephoto end), and the telephoto end.

TABLE 1

| | Numerical Example | | | |
|---|---|---|---|---|
| Condition | 1 | 2 | 3 | 4 |
| (1) | 0.79 | 0.75 | 0.61 | 0.83 |
| (2) | 0.98 | 0.98 | 0.99 | 0.96 |
| (3) | 1.81 | 1.80 | 1.68 | 1.83 |
| (4) | 0.15 | 0.17 | 0.195 | 0.152 |

TABLE 1-continued

| | Numerical Example | | | |
|---|---|---|---|---|
| Condition | 1 | 2 | 3 | 4 |
| Fno wide | 2.02 | 2.02 | 2.01 | 2.01 |
| Fno tele | 2.03 | 2.03 | 2.04 | 2.11 |

*In Table 1, the following mathematical expressions are used for the conditions (1) through (4):
Condition (1): $0.5 < |\beta t2/\beta w2| < 1.0$
Condition (2): $0.9 < XW\beta W/XT\beta T < 1.1$
Condition (3): $1.0 < |\phi m/\phi w| < 3.0$
Condition (4): $0.05 < Lc/L < 0.3$

TABLE 2

| Numerical Example | β2W | β2M | β2T |
|---|---|---|---|
| 1 | 2.64 | 2.16 | 2.07 |
| 2 | 2.61 | 2.07 | 1.97 |
| 3 | 4.63 | 3.09 | 2.82 |
| 4 | 2.39 | 2.06 | 1.99 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-144216 filed Jun. 24, 2010, which is hereby incorporated by reference herein in its entirety.

What is claimed is:

1. A zoom lens comprising, in order from an enlargement side to a reduction side:
   a first lens unit having a positive refractive power, which is stationary for variation of magnification;
   a second lens unit having a negative refractive power, which moves for variation of magnification;
   a third lens unit having a negative refractive power, which moves for variation of magnification;
   a fourth lens unit having a positive refractive power, which includes a stop and which moves for variation of magnification; and
   at least one lens unit,
   wherein for variation of magnification from a wide-angle end to a telephoto end, the second lens unit and the third lens unit move towards the reduction side and the fourth lens unit move towards the enlargement side, and
   wherein, when βt2 is a lateral magnification of the second lens unit at the telephoto end, and βw2 is a lateral magnification of the second lens unit at the wide-angle end, the following condition is satisfied:

$$0.5 < |\beta t2/\beta w2| < 1.0.$$

2. The zoom lens according to claim 1, wherein, when φm is a highest power in absolute value of powers of negative lenses located on the reduction side of the stop, φw is a power of the entire zoom lens at the wide-angle end, Lc is a difference between a position at the wide-angle end and a position at the telephoto end of a moving lens unit including a negative lens having the highest power in absolute value of powers of negative lenses located on the reduction side of the stop, and L is a total length of the zoom lens, the following conditions are satisfied:

$$1.0 < |\phi m/\phi w| < 3.0$$

$$0.05 < Lc/L < 0.3.$$

3. The zoom lens according to claim 2, wherein the negative lens is a lens included in the moving lens unit located closest to the reduction side.

4. The zoom lens according to claim 3, wherein the negative lens is located closest to the reduction side.

5. The zoom lens according to claim 2, wherein the moving lens unit including the negative lens moves the distance Lc for variation of magnification between a position at the wide-angle end and a position at the telephoto end.

6. The zoom lens according to claim 1, wherein the lateral magnification of the second lens unit has a positive value in the entire zooming range.

7. The zoom lens according to claim 1, wherein, when XW is an air equivalent distance between a focal position of the lens units located on the enlargement side of the stop and the stop at the wide-angle end, βW is an overall image forming magnification of the lens units including the stop and located on the reduction side at the wide-angle end, XT is an air equivalent distance between a focal position of the lens units located on the enlargement side of the stop and the stop at the telephoto end, and βT is an overall image forming magnification of the lens units including the stop and located on the reduction side at the telephoto end, the following condition is satisfied:

$$0.9 < XW\beta W / XT\beta T < 1.1.$$

8. The zoom lens according to claim 1, wherein the stop includes a predetermined lens having an effective diameter smallest of the effective diameters of all lenses included in the zoom lens or a supporting portion of the predetermined lens.

9. An image projection apparatus comprising:
a zoom lens including in order from an enlargement side to a reduction side:
  a first lens unit having a positive refractive power, which is stationary for variation of magnification;
  a second lens unit having a negative refractive power, which moves for variation of magnification;
  a third lens unit having a negative refractive power, which moves for variation of magnification;
  a fourth lens unit having a positive refractive power, which includes a stop and which moves for variation of magnification; and
  at least one lens unit,
  wherein for variation of magnification from a wide-angle end to a telephoto end, the second lens unit and the third lens unit move towards the reduction side and the fourth lens unit move towards the enlargement side, and
  wherein the βt2 is a lateral magnification of the second lens unit at the telephoto end, and βw2 is a lateral magnification of the second lends unit at the wide-angle end, the following condition is satisfied:

$$0.5 < |\beta t2 / \beta w2| < 1.0.$$

* * * * *